(12) United States Patent
Chung et al.

(10) Patent No.: US 6,885,410 B2
(45) Date of Patent: Apr. 26, 2005

(54) LIQUID CRYSTAL DISPLAY DEVICE WITH SUBSTANTIALLY BILATERALLY SYMMETRIC PIXEL ELECTRODES

(75) Inventors: In Jae Chung, Kyongsangbuk-do (KR); June Ho Park, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 59 days.

(21) Appl. No.: 09/893,991

(22) Filed: Jun. 29, 2001

(65) Prior Publication Data

US 2002/0008792 A1 Jan. 24, 2002

(30) Foreign Application Priority Data

Jul. 4, 2000 (KR) ................................ 10-2000-0038015

(51) Int. Cl.⁷ ........................ G02F 1/1343; G02F 1/136
(52) U.S. Cl. .............................. 349/38; 349/39; 349/42
(58) Field of Search .......................... 349/38, 39, 42, 349/44

(56) References Cited

U.S. PATENT DOCUMENTS

| 5,058,995 | A | * | 10/1991 | Plus ............................. 349/43 |
| 5,659,375 | A | * | 8/1997 | Yamashita et al. ............ 349/38 |
| 5,677,745 | A | * | 10/1997 | Kawano et al. ............... 349/42 |
| 5,825,439 | A | * | 10/1998 | Noriyama ..................... 349/54 |
| 6,078,364 | A | * | 6/2000 | Atherton ....................... 349/38 |
| 6,088,071 | A | * | 7/2000 | Yamamoto et al. ........... 349/38 |
| 6,091,464 | A | * | 7/2000 | Song ............................ 349/38 |
| 6,384,878 | B1 | * | 5/2002 | Kwak ........................... 349/40 |
| 6,411,347 | B1 | * | 6/2002 | Park et al. .................... 349/39 |
| 6,429,907 | B1 | * | 8/2002 | Park et al. .................... 349/38 |

* cited by examiner

Primary Examiner—Tarifur R. Chowdhury
Assistant Examiner—Jeanne Andrea Di Grazio
(74) Attorney, Agent, or Firm—Morgan Lewis & Bockius LLP

(57) ABSTRACT

A liquid crystal device (LCD) includes a first substrate; a second substrate coupled to the first substrate; a plurality of scan lines and a plurality of data lines arranged over the first substrate, the scan lines intersecting the data lines to define pixel areas; thin film transistors (TFTs) over the first substrate adjacent intersections of the scan lines and data lines; substantially bilaterally symmetric pixel electrodes in the pixel areas; and a liquid crystal layer interposed between the first and second substrates.

18 Claims, 6 Drawing Sheets

LIQUID CRYSTAL DISPLAY DEVICE WITH SUBSTANTIALLY BILATERALLY SYMMETRIC PIXEL ELECTRODES

This application claims the benefit of Korean Application No. P 2000-38015, filed in Korea on Jul. 4, 2000, which is hereby incorporated by reference.

BACKGROUND OF THE INVENTION

1. Field of the Invention

The present invention relates to a display device, and more particularly, to a liquid crystal display device.

2. Discussion of the Related Art

Among various display devices, a cathode tube ray (CRT) has been widely used for monitors in television, measuring instrument and digital assistant equipment. However, due to its large weight and size, the CRT has been inapt for effectively responding to recent demands for downsizing and weight reduction of electronic appliances.

A liquid crystal display (LCD), which is advantageously light weighted and small sized, has been actively developed in an effort to replace the CRT. According to the recent development, the LCD can sufficiently function as a flat display device, and the demand therefor is increasing.

In general, a low cost and high performance line film transistor LCD (TFT-LCD) uses an amorphous silicon thin film transistor as a switching device. At present, the LCD is oriented towards a high resolution display that operates in a video graphic array (VGA) mode with the maximum resolution of 640×480 pixels, a super video graphic array (SVGA) mode of 800×600 pixels or in an extended video graphic array (XVGA) mode of 1024×768 pixels.

The development and application of the TFT-LCD industry have been accelerated due to the recent increase in size and resolution of the TFT-LCD. Significant efforts are devoted to process simplification and yield rate improvement to achieve productivity increase and low cost.

An LCD utilizes the electro-optic properties of a liquid crystal material injected into the LCD panel. In order to display the image on the front surface of the LCD panel, a backlight is required as a light source that uniformly irradiates the back of the LCD panel. The backlight is necessary because the LCD is non-luminous and without a self luminescent property unlike a plasma display panel (PDP) or a field emission display (FED).

A related art LCD will be described in reference to the appended drawings. FIG. 1 is a layout view of the LCD of the related art, and FIG. 2 is a sectional view taken along the line I–I' of FIG. 1. As shown in FIGS. 1 and 2, the LCD of the related art includes scan lines 11 extending in one direction; data lines 13 and 13a extending in a direction intersecting the scan lines 11, and thin film transistors (TFTs) 15 formed adjacent the intersecting portions between the scan lines 11 and the data lines 13. The TFTs each have a gate electrode extending from the scan line 11 and source and drain electrodes formed of the same material as the data lines 13. The LCD further includes pixel, electrodes 17 electrically connected to the respective drain electrodes of each pixel area. The pixel electrodes 17 are shaped to overlap in part with adjacent scan lines 11 so as to be used as an electrode of a storage capacitor at each pixel area. The pixel, electrodes 17 are also shaped so as to avoid the areas at which the TFTs are formed. Electrodes 19 may be formed at the area of the storage capacitor to constitute a part of the storage capacitors.

In this construction, at each pixel, parasitic capacitors, the capacitance of which are represented by Cdp1 and Cdp2, are created between each data line 13 and each pixel electrode 17 and between each pixel electrode 17 and each data line 13a, respectively.

FIG. 3 shows a magnified plan view of the pixel electrode according to the related art. Referring to FIG. 3, the pixel electrode 17 of the related art has asymmetric right and left sections. Such an asymmetrical shape results because the pixel electrode 17 is patterned so as not to cover a portion corresponding to the TFT 15. The asymmetrical shape in the pixel electrode 17 creates a difference between the values of the parasitic capacitanes,es Cdp1 and Cdp2 between the data lines 13 and 13a and the pixel electrode 17. In the example of FIG. 3, the value Cdp2 is larger than Cdp1. Due to the asymmetric pixel electrode shape, the LCD of the related art has the parasitic capacitors between the pixel electrode and the data lines, which have different values in capacitance between the right section and the left section. The LCD of the related art suffers a drawback that,,when the LCD is operated in a dot inversion mode, the resolution of the LCD degrades.

SUMMARY OF THE INVENTION

Accordingly, the present invention is directed to a liquid display device (LCD) that substantially obviates the problems due to limitations and disadvantages of the related art.

An object of the present invention is to provide a liquid crystal display (LCD) having an improved resolution characteristic.

Another object of the present invention is to provide a liquid crystal display (LCD) having an improved resolution characteristic without sacrificing the storage capacitance or the aperture ratio.

Additional features and advantages of the invention will be set forth in the description that follows, and in part will be apparent from the description, or may be learned by practice of the invention. The objectives and other advantages of the invention will be realized and obtained by the structure and methods particularly pointed out in the written description and claims hereof as well as the appended drawings.

To achieve these and other advantages and in accordance with the purpose of the present invention, as embodied and broadly described, the present invention provides a liquid crystal device (LCD) including a first substrate; a second substrate coupled to the first substrate; a plurality of scan lines and a plurality of data lines arranged over the first substrate, the scan lines intersecting the data lines to define pixel areas; thin film transistors (TPTs) over the first substrate adjacent intersections of the scan lines and data lines; substantially bilaterally symmetric pixel electrodes in the pixel areas; and a liquid crystal layer interposed between the first and second substrates.

In another aspect, the present invention provides a liquid crystal display (LCD) including a plurality of scan lines and a plurality of data lines, the scan lines intersecting the data lines to define pixel areas, each of the pixel areas including a pixel electrode; a pair of a first projection and a second projection projecting from an adjacent scan line at one side, the first projection being separated from the second projection; a thin film transistor (TFT) formed adjacent an intersection of the adjacent scan line and an adjacent data line; and a storage capacitor connected to the pixel electrode, the storage capacitor including an electrode overlapping with the second projection of the scan line for an adjacent pixel area, wherein in each of the pixel areas, the pixel electrode has a projection connected to the TFT, the projection of the pixel electrode being disposed between the first projection and the second projection of the adjacent scan line, the pixel electrodes further having a portion overlapping with the scan line for the adjacent pixel area.

In a further aspect, the present invention provides a thin film transistor (TFT) substrate for a liquid crystal display device, the TFT substrate including a substrate; a plurality of scan lines over the substrate, extending substantially in a horizontal direction; a plurality of data lines over the substrate, extending substantially in a vertical direction to intersect the scan lines, the scan lines and the data lines defying an array of pixel areas over the substrate; a thin film transistor in each pixel area, one terminal of the thin film transistor being connected to one of the adjacent data lines, another terminal of the thin film transistor being connected to one of the adjacent scan lines; and a pixel electrode in each pixel area, connected to still another terminal of the thin film transistor in the pixel area, the pixel electrode having a pattern configured to yield substantially the same capacitance value for capacitors that are formed between the pixel electrode and the adjacent data line on one side and between the pixel electrode and the adjacent data line on another side.

It is to be understood that both the foregoing general description and the following detailed description are exemplary and explanatory and are intended to provide farther explanation of the invention as claimed.

BRIEF DESCRIPTION OF THE DRAWINGS

The accompanying drawings, which are included to provide a further understanding of the invention and are incorporated in and constitute a part of thus specification, illustrate embodiments of the invention and together with the description serve to explain the principles of the invention.

In the drawings.

DETAILED DESCRIPTION OF THE PREFERRED EMBODIMENTS

In an example of the present invention, an LCD of the present invention includes first and second substrates; a plurality of scan lines and data lines arranged on the first substrate, the scan lines intersecting the data lines to define pixel areas; TFTs formed in intersecting portions of the scan and data lines; substantially bilaterally symmetric pixel electrodes formed in the pixel areas; and a liquid crystal layer formed between the first substrate and the second substrate.

It was discovered that the degradation drawback in the resolution of the LCD of the related art is caused at least in part by the difference in parasitic capacitance values discussed in the Background of the Invention section above. In order to prevent the decrease in resolution, the LCD according to this aspect of the present invention has pixel electrodes having substantially bilateral symmetric. According to this construction of the present invention, the resolution degradation is significantly reduced or nearly eliminated.

An indium tin oxide (ITO) layer, for example, may be used as the pixel electrodes. In such a case, the lower left part of the ITO layers is removed to avoid the TFTs. In this example, the lower right part of the ITO layers are also removed as much as the lower left part of the ITO layers is removed to form the pixel electrode pattern that is bilaterally symmetric.

If desired, the width of the scan lines may preferably be reduced to compensate for the decrease in the aperture ratio as a result of the bilateral symmetrical structure. In such a case, if desired, in order to compensate the reduction in the amount of the storage capacitance due to the reduction in the width of the scan lines, electrodes of storage capacitors may preferably be extended into a space created by the removal of the lower right part of the ITO layers. This way, the space created by removal of the lower right part of the ITO layer can be used effectively.

In another example of the present invention, an LCD of the present invention includes first and second substrates; a plurality of scan lines and data lines arranged on the first substrate, the scan lines intersecting the data lines to define pixel areas; TFTs formed in intersecting portions of the scan and data lines; pixel electrodes formed in the pixel areas, the pixel electrodes each being configured to have substantially the same parasitic capacitance with respect to the adjacent data lines; and a liquid crystal layer formed between the first substrate and the second substrate.

Reference will now be made in detail to the preferred embodiments of the present invention, examples of which are illustrated in the accompanying drawings.

First Embodiment

Figure 1:
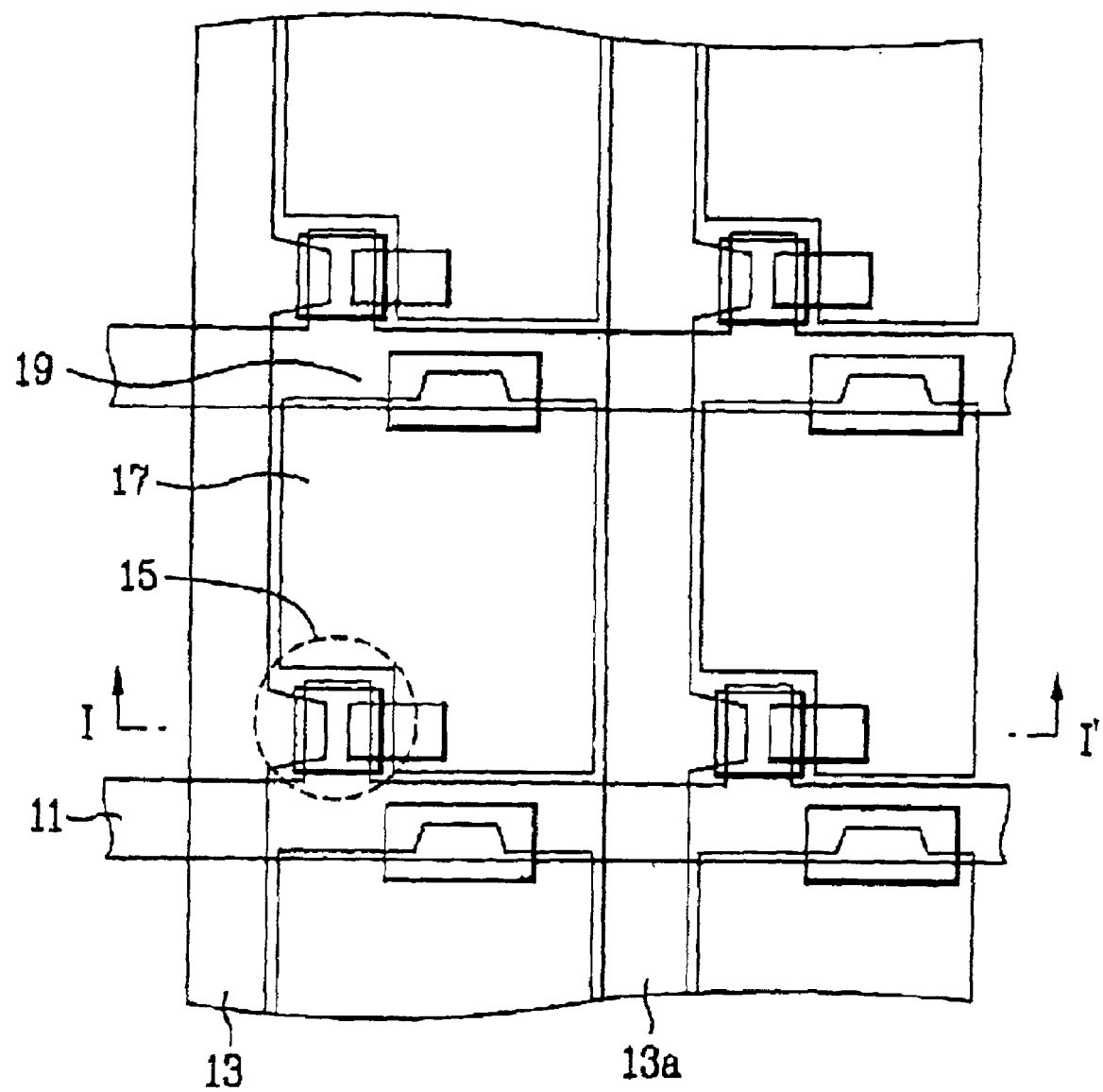
FIG. 1 is a layout view of an LCD according to the related art.
Figure 2:
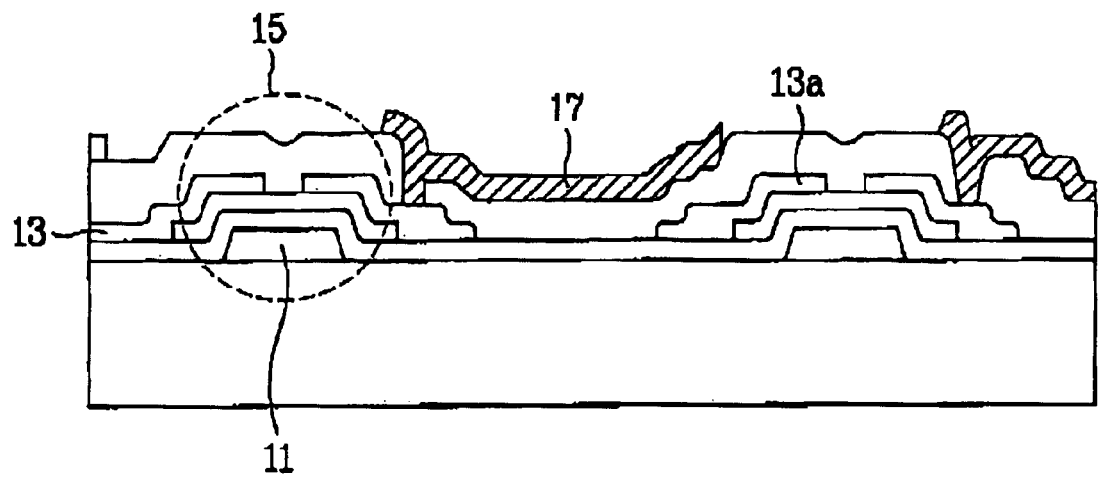
FIG. 2 is a sectional view taken along the line I–I' of FIG. 1.
Figure 3:
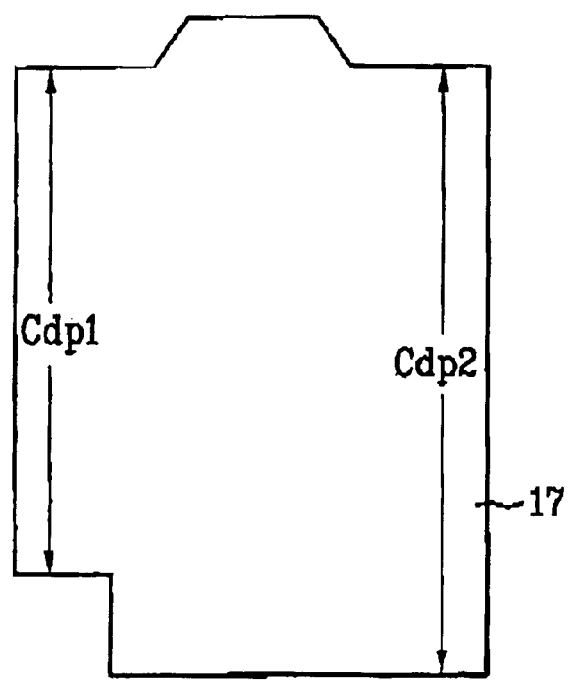
FIG. 3 is a plan view of a pixel electrode according to the related art.
Figure 4:
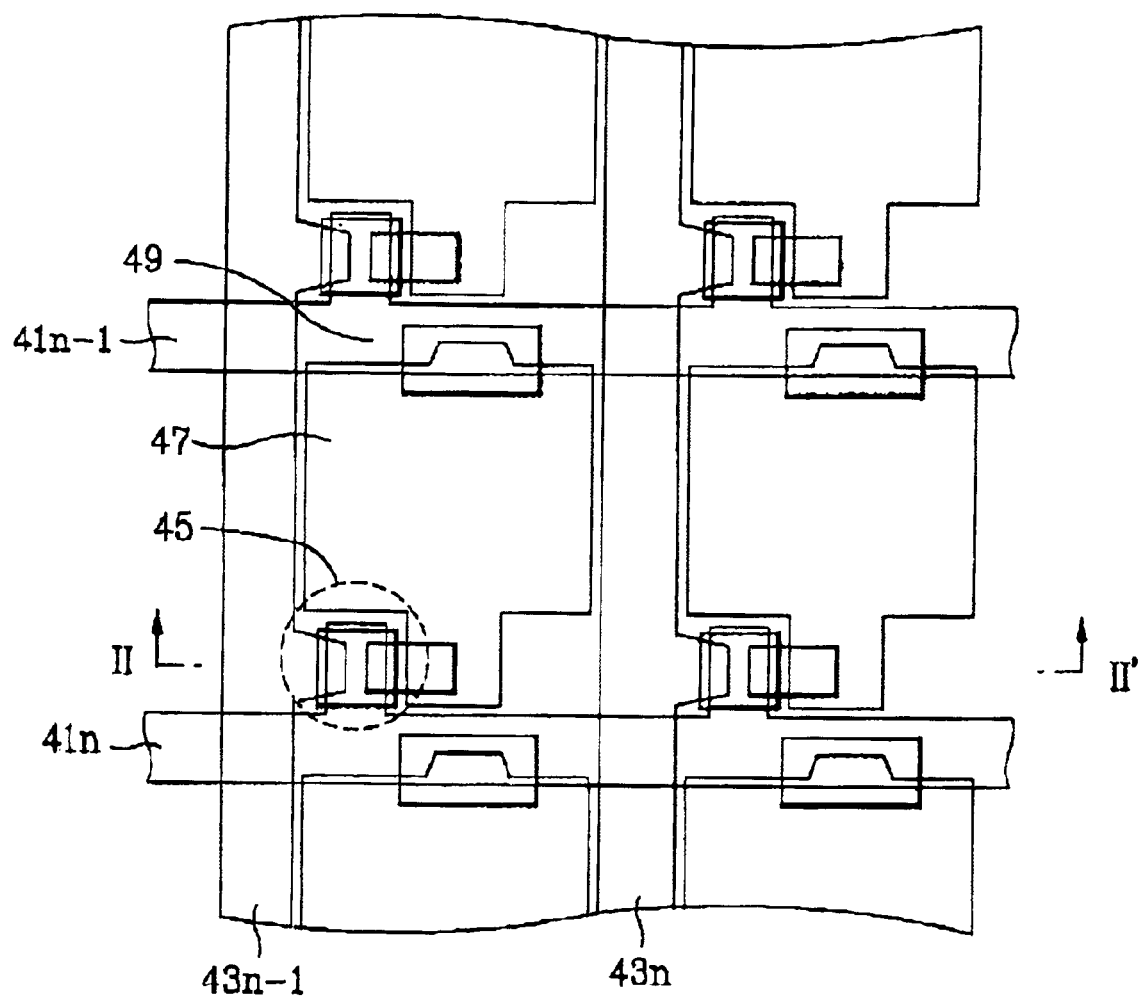
FIG. 4 is a layout view of an LCD according to a first embodiment of the present invention.
Figure 5:
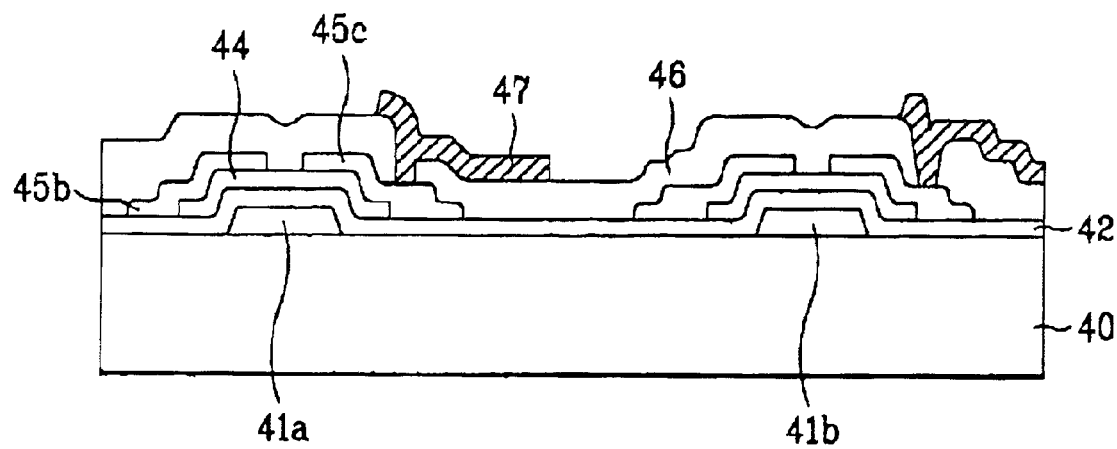
FIG. 5 is a sectional view taken along the line II–II' of FIG. 4.

FIG. 4 is a layout view of an LCD according to a first embodiment of the present invention. FIG. 5 is a sectional view taken along the line II–II' of FIG. 4. As shown in FIG. 4, the LCD of this example includes a plurality of scan lines 41n-1 and 41n extending in one direction and a plurality of data lines 43n-1 and 43n extending in a direction intersecting the scan lines. The scan lines and the data lines define pixel areas. Thin film transistors (TFTs) 45 each have a gate electrode, and a source electrode and a drain electrode are formed adjacent the intersecting portions of the scan lines and the data lines. In each of the TFTs 45, the gate electrode is branched off from an adjacent one of the scan lines, and the source electrode extends from an adjacent one of the data lines. The pixel areas are provided with pixel electrodes 47 connected with the respective drain electrodes via contact holes (not shown in the figures). Each of electrodes 49 serves as an electrode of the corresponding storage capacitance.

As shown in FIG. 4, each of the pixel electrodes 47 is patterned to be absent at the lower right and lower left corners, thereby being bilaterally symmetric about a vertical reference line crossing the center of the pixel area in the direction of the data lines.

FIG. 5 shows a sectional view taken along the line II–II' in FIG. 4. The LCD according to the first embodiment of the present invention includes an insulation substrate 40, gate electrodes 41a, 41b formed on the insulation substrate 40, and a gate insulation film 42 on the insulation substrate 40 that includes the gate electrodes 41a, 41b, A semiconductor layer 44 is formed on the gate insulation film 42 over the gate electrodes 45a. A source electrodes 45b and a drain electrodes 45c are formed on the semiconductor layer and are separated at the upper pan of the semiconductor layer 44. A passivation layer 46 then is formed over the entire surface having the thus formed structure. Pixel electrodes 47 are connected to the drain electrodes 45c via the contact holes. In this cross-sectional view, each of the pixel electrodes 47 maintains a spacing from the adjacent data line because of the shape of the pixel electrodes 47 at the lower right part.

According to the first embodiment of the present invention, each of the pixel electrodes, 47 is bilaterally symmetric so that the value of the parasitic capacitance formed by The pixel electrode 47 and the data line 43n-1 at the left side is substantially the same as the value of the parasitic capacitance formed by the pixel electrode 47 and the data line 43n at the right side. Therefore, the parasitic capacitance values between the adjacent data lines and the pixel electrode 47 are not different, and accordingly, the degradation of resolution can be prevented.

Figure 6:
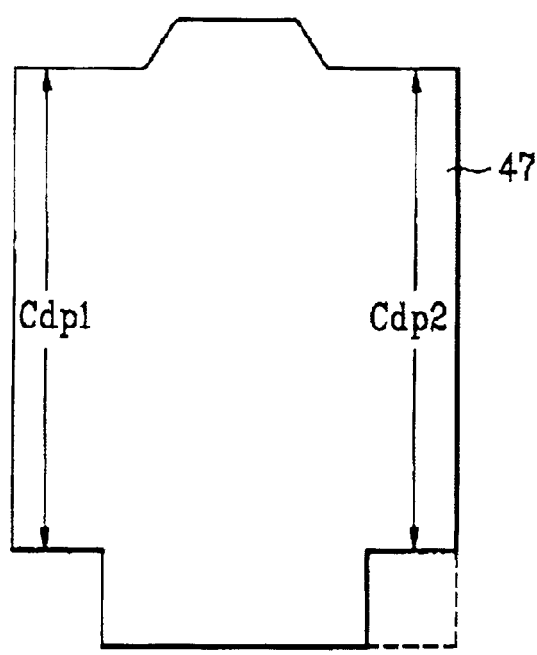
FIG. 6 is a plan view of a pixel electrode according to the first embodiment of the present invention.

FIG. 6 is a magnified plan view of the pixel electrode according to this example. As shown in the figure, the pixel electrode 47 is bilaterally symmetric. Therefore, the capacitance values Cdp1 and Cdp2 are substantially the same. In FIG. 6, because these parasitic capacitance values are substantially proportional to the length of the left most side and right most side, respectively, of the pixel electrode, Cdp1 and Cdp2 are symbolically represented by the length of the sides of the pixel electrode 47. (For comparison, a dotted line indicates the portion removed from the pixel electrode of the related art.)

Second Embodiment

A second embodiment of the present invention has a structure that enables efficient utilization of the removed portions at the lower right parts of ITOs (pixel electrodes) in the first embodiment. Specifically, electrodes of storage capacitors are extended to the removed lower right part of the ITOs (pixel electrodes) of the previous row to increase the storage capacitance. This in turn enables a reduction of the width of the scan lines, which helps improve the aperture ratio of the LCD panel, as explained below in more detail.

Figure 7:
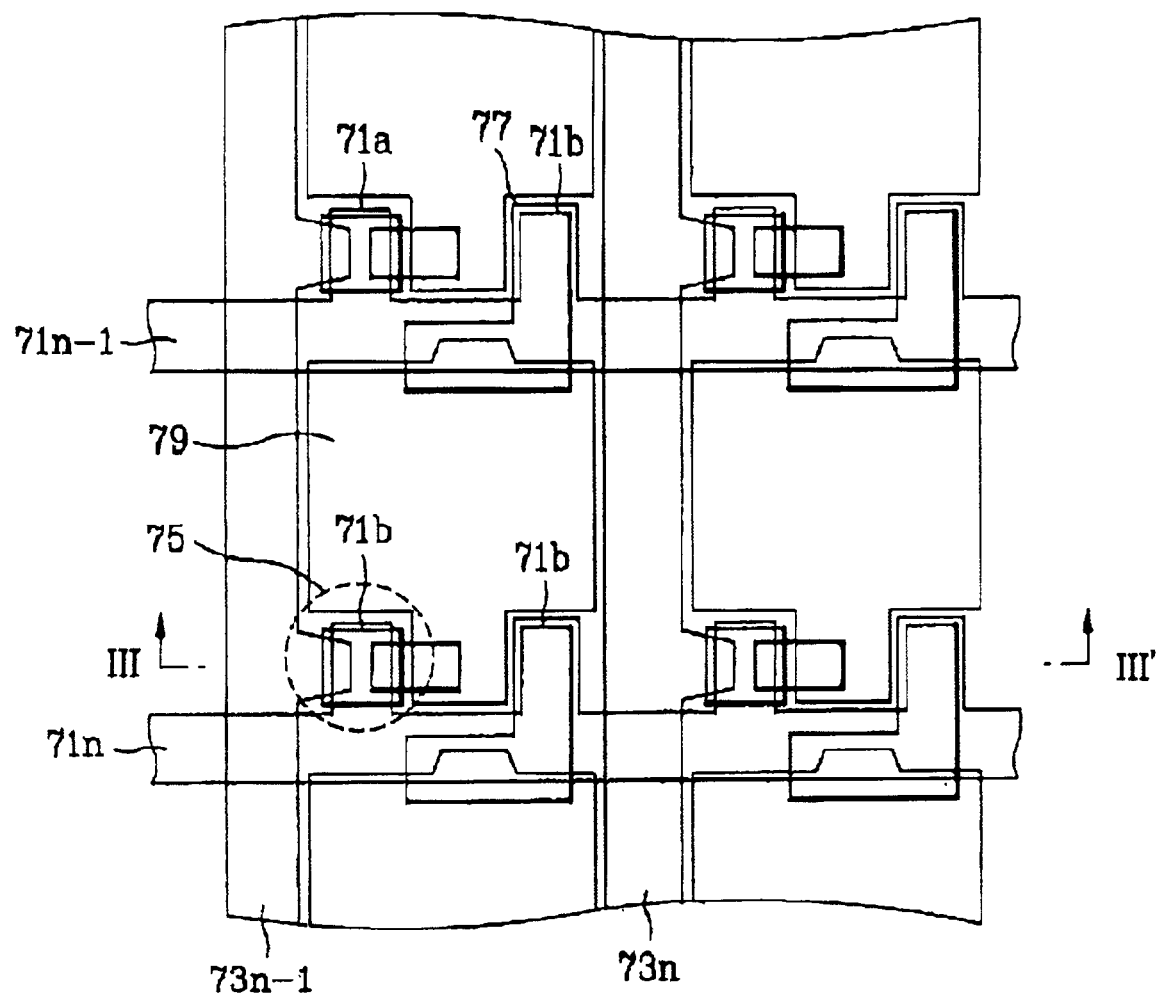
FIG. 7 is a layout view of an LCD according to a second embodiment of the present invention.
Figure 8:
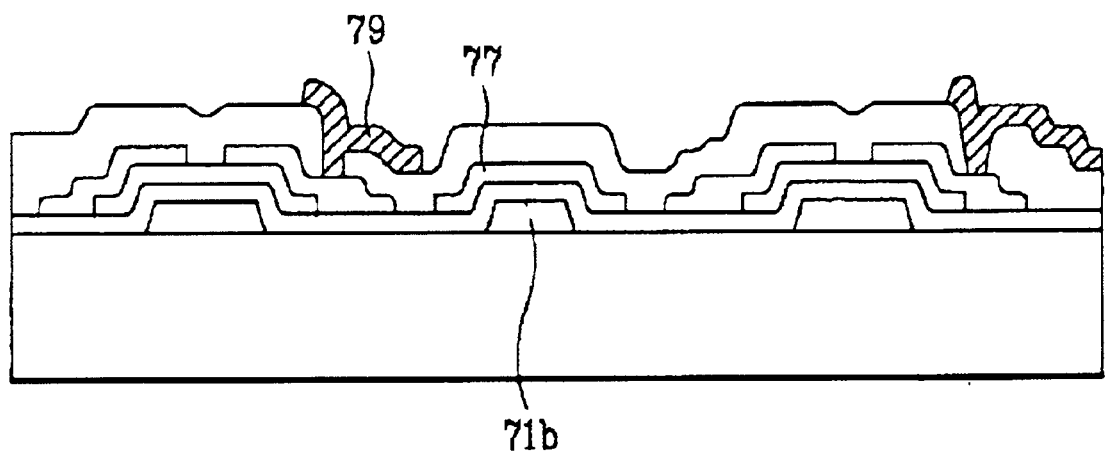
FIG. 8 is a sectional view taken along the line III–III' of FIG. 7.

FIG. 7 is a layout view of an LCD according to the second embodiment of the present invention, and FIG. 8 is a sectional view taken along the line III–III' of FIG. 7.

As shown in FIG. 7, the LCD according to the second embodiment of the present invention includes scan lines 71n-1 and 71n extending in one direction. Each of the scan lines has first and second projections 71a and 71b with a spacing therebetween in each pixel area. The LCD of this example further includes data lines 73n-1 and 73a extending in a direction intersecting the scan lines 71n-1 and 71n at the respective sides of the first and second projections 71a and 71b. Each of TFTs 75 includes a gate electrode branching off from the scan line as the first projection 71a, a source electrode, and a drain electrode branching off from a data line. The LCD of this example further includes electrodes 77 each overlapping with the scan line and the second projection 71b to serve as an electrode of the storage capacitor, and pixel electrodes 79. Each of the pixel electrodes 79 has a projection (extending downwardly in the figure) between the first projections 71a and the second projections 71b, and further has an upper portion overlapping with the scan lines 71n-1 of the previous row, which is used for the storage capacitor.

Here, the lower part projection of each of the pixel electrodes 79 is disposed at the center of the bottom edge. Relative to this center projection, the TFT 75 is formed at the left side, and the electrodes of the storage capacitor are extended at the right side.

When the pixel electrodes 79 have the shape in which the lower right corner is removed as shown in FIG. 7, the aperture ratio of the LCD panel decreases by the removed amount if no additional measure is taken. To compensate for this reduction, in the second embodiment of the present invention, the width of the scan lines may be decreased.

In general, the primary function of the scan lines is to transfer scan signals to the gate electrode of each of the TFTs connected to them. However, the width of the scan lines has been designed to be considerably wider than that which is necessary for the proper signal transfer function. Such wide-width scan lines were adopted to provide for a sufficient capacitance of the storage capacitor, which is constructed in part by the scan lines as explained above.

In the second embodiment of the present invention, because the area for the storage capacitance is increased by utilizing the lower left part of the pixel in which the pixel electrode is removed, the width of die scan lines may be reduced to compensate the reduction in the aperture ratio (or even improve the aperture ratio) without sacrificing the storage capacitance. In other words, if desired, the width of the scan lines can be reduced to compensate the reduction in the aperture ratio (or even improve it), which is caused by the removal of the lower right portion of the pixel electrode; however, the resultant loss in the storage capacitance in turn can be compensated by expanding the electrodes of the storage capacitance to the space created by the removal of the lower right portion of the pixel electrode.

A preferred width of the scan lines is determined according to a required capacitance of the storage capacitors, the degree of compensating the aperture ratio (or a target aperture ratio), the model type and the material of the scan lines. For example, the width is preferably about 12 $\mu$m to about 25 $\mu$n when aluminum of a general-use degree is used for the material of the scan lines.

FIG. 8 is a sectional view taken along the line III–III' of FIG. 7. As shown in the figure, the second projection 71b and the electrode 77 are formed at the right of the pixel electrode 79. Thus, this section of the storage capacitor is disposed between the pixel electrode 79 and the data line of the next column.

In this example, the electrode 77 for the storage capacitance is connected to the pixel electrodes 79 via a contact hole (not shown in the figure) at the portion of the pixel electrode 79 overlapping with the electrode 77. Thus, the gate insulating layer interposed between the scan line and the electrode for the storage capacitor serves as a dielectric for the storage capacitance. The first embodiment has a similar construction. However, the structure of the storage capacitance may take various other forms. For example, if desired, by connecting the electrode for the storage capacitance to the scan lines via a contact hole instead, the passivation layer may serve as the storage capacitor dielectric. Furthermore, if the pixel electrode is to be formed below the passivation layer (which is one of various other possible constructions of a basic pixel structure), no contact holes are necessary to connect the pixel electrode to the drain electrode and to connect the pixel electrode to the storage capacitor electrode. Moreover, depending upon the design requirements and desired storage capacitance value, the electrodes 77 may be removed. In such a case, the storage capacitance is formed by the pixel electrode and the scan line, and parts of the pixel electrode and scan lines that constitute the storage capacitance may be shaped in a manner similar to those disclosed herein.

Liquid crystal displays according to the present invention have, among others, the following advantages and effects. Since the values of the parasitic capacitors formed by each of the pixel electrodes and the corresponding adjacent data lines are made substantially the same at either side (because of the substantially bilateral symmetry of the pixel electrodes in the case of the first embodiment), a resolution degradation which would otherwise occur due to a difference in the parasitic capacitance values can be prevented. Also, when the lower right part of each of the pixel electrodes is removed to form a substantially plane-symmetric pixel electrodes (symmetric with respect to a line passing the center of the pixel area), the storage capacitors may be expanded by utilizing the space created by the removal of the lower right part of the pixel electrodes. This enables prevention of the storage capacitance decrease and compensates the reduction of the aperture ratio, which may otherwise occur as a result of the substantially bilaterally symmetrical pixel electrode pattern.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal divide (LCD) comprising:
   a first substrate;
   a second substrate coupled to the first substrate;
   a plurality of scan lines and a plurality of data lines arranged over the first substrate, the scan lines intersecting the data lines to define pixel areas;
   thin film transistors (TFTs) over the first substrate adjacent intersections of the scan lines and data lines;
   pixel electrodes respectively arranged in corresponding pixel areas such that each pixel electrode is substantially bilaterally symmetric about a vertical reference line crossing the center of the respectively corresponding pixel area in a direction of the data lines, wherein each of the pixel electrodes has a shape in which a lower right corner and a lower left corner thereof are removed; and
   a liquid crystal layer interposed between the first and second substrates.

2. The LCD according to claim 1, wherein each of the pixel electrodes has a lower center projection extending downwardly.

3. The LCD according to claim 2, wherein each of the pixel electrodes is electrically connected to a TFT at the lower center projection thereof.

4. A liquid crystal display (LCD) including a plurality of scan lines and a plurality of data lines, the scan lines intersecting the data lines to define pixel areas, each of the pixel areas including:
   a pixel electrode;
   a pair of a first projection and a second projection projecting from an adjacent scan line at one side, the first projection being separated from the second projection;
   a thin film transistor (TFT) formed adjacent an intersection of the adjacent scan line and an adjacent data line; and
   a storage capacitor connected to the pixel electrode, the storage capacitor including an electrode overlapping with the second projection of the scan line for an adjacent pixel area,
   wherein in each of the pixel areas, the pixel electrode has a projection connected to the TFT, the projection of the pixel electrode being disposed between the first projection and the second projection of the adjacent scan line, the pixel electrodes further having a portion overlapping with the scan line for the adjacent pixel area.

5. The LCD according to claim 4, wherein in each of the pixel areas, the first projection is a gate electrode of the TFT.

6. The LCD according to claim 4, wherein in each of the pixel areas, the pixel electrode has a shape avoiding the first projection and the second projection of the adjacent scan line.

7. The LCD according to claim 4, wherein in each of the pixel areas, the electrode for the storage capacitor has a shape projecting towards a lower right part of the pixel electrode in the adjacent pixel area.

8. The LCD according to claim 4, wherein each pixel electrode is substantially bilaterally symmetric.

9. A thin film transistor (TFT) substrate for a liquid crystal display device, the TFT substrate comprising:
   a substrate;
   a plurality of scan lines over the substrate, extending substantially in a horizontal direction;
   a plurality of data lines over the substrate, extending substantially in a vertical direction to intersect the scan lines, the scan lines and the data lines defining an array of pixel areas over the substrate;
   a thin film transistor in each pixel area, one terminal of the thin film transistor being connected to one of the adjacent data lines, another terminal of the thin film transistor being connected to one of the adjacent scan lines; and
   a pixel electrode in each pixel area, connected to still another terminal of the thin film transistor in the pixel area, the pixel electrode having a pattern configured to yield substantially the same capacitance value for capacitors that are formed between the pixel electrode and the adjacent data line on one side and between the pixel electrode and the adjacent data line on another side, wherein the pixel electrode has a substantially rectangular pattern in which a lower right corner and a lower left corner thereof are removed by substantially the same amount.

10. The TFT substrate according to claim 9, wherein the pattern of the pixel electrode is symmetric about a virtual line extending substantially vertically and passing a center of the pixel area.

11. The TFT substrate according to claim 9, wherein each of the pixel areas includes a storage capacitor connected to the pixel electrode for the pixel area.

12. The TFT substrate according to claim 11, wherein an area occupied by the storage capacitor for a pixel area extends into an adjacent pixel area.

13. The TFT substrate according to claim 12, wherein each pixel area has a space between the pixel electrode and one of the adjacent data lines, and
   wherein the area occupied by the storage capacitor for a pixel area extends into such a space in an adjacent pixel area.

14. The TFT substrate according to claim 13, wherein each pixel area includes a projection projecting from the adjacent scan line that is connected to the TFT in the pixel area, and
   wherein the storage capacitor for a pixel area is constructed at least in part by the projection of the scan line for an adjacent pixel area.

15. The TFT substrate according to claim 14, wherein each pixel area has an electrode for the storage capacitor, the electrode for the storage capacitor for a pixel area overlapping with the scan line for an adjacent pixel area and the projection thereof.

16. The TFT substrate according to claim 15, wherein the pixel electrode in each of the pixel areas has a portion overlapping with the scan line for an adjacent pixel area, and wherein the storage capacitor for the pixel area is constructed at least in part by the portion of the pixel electrode that overlaps with the scan line for the adjacent pixel area.

17. The TFT substrate according to claim 9, wherein each pixel area has spaces between the pixel electrode and adjacent data lines, and the area of the space between the pixel electrode and one of the adjacent data lines is substantially the same as the area of the space between the pixel electrode and another one of the adjacent data lines.

18. The TFT substrate according to claim 17, wherein each pixel area includes a storage capacitor connected to the pixel electrode for the pixel area, and wherein an area occupied by the storage capacitor for a pixel area extends into an adjacent pixel area.

* * * * *